(12) United States Patent
Morita et al.

(10) Patent No.: US 6,574,122 B2
(45) Date of Patent: Jun. 3, 2003

(54) LOW-NOISE SWITCHING POWER SUPPLY

(75) Inventors: Koichi Morita, Fujimi (JP); Myung-Jun Lee, Seoul (KR); Jun Young Ahn, Incheon (KR); Ho-Jun Shin, Seoul (KR)

(73) Assignee: Sanken Electric Co., Ltd. (JP)

( * ) Notice: Subject to any disclaimer, the term of this patent is extended or adjusted under 35 U.S.C. 154(b) by 0 days.

(21) Appl. No.: 10/075,720

(22) Filed: Feb. 14, 2002

(65) Prior Publication Data

US 2002/0114176 A1 Aug. 22, 2002

(30) Foreign Application Priority Data

Feb. 16, 2001 (JP) ........................................ 2001-040180

(51) Int. Cl.[7] ............................................. H02M 3/335
(52) U.S. Cl. ........................ 363/21.01; 363/40; 363/97
(58) Field of Search ................................ 363/20, 21.01, 363/21.02, 21.04, 21.12, 39, 40, 95, 97, 131

(56) References Cited

U.S. PATENT DOCUMENTS

| | | | |
|---|---|---|---|
| 5,331,534 A | * 7/1994 | Suzuki et al. ................. | 363/20 |
| 6,069,803 A | * 5/2000 | Cross ....................... | 363/21.14 |
| 6,301,129 B1 | * 10/2001 | Yasumura ................. | 363/21.03 |
| 6,366,474 B1 | * 4/2002 | Gucyski ..................... | 363/20 |
| 6,466,463 B1 | * 10/2002 | Morita ..................... | 363/21.16 |

FOREIGN PATENT DOCUMENTS

JP 8-154379 A 6/1996

\* cited by examiner

Primary Examiner—Adolf Deneke Berhane
(74) Attorney, Agent, or Firm—Woodcock Washburn LLP

(57) ABSTRACT

A low-noise, high-power-factor power supply includes a transformer having a primary winding connected to a pair of a.c. input terminals via a rectifier circuit, and a secondary winding connected to a pair of d.c. output terminals via a rectifying and smoothing circuit. Connected between the pair of outputs of the rectifier circuit via at least part of the transformer primary, a switch is turned on and off to keep the d.c. output voltage constant. A smoothing capacitor is connected between the pair of outputs of the rectifier circuit via at least part of the transformer primary and a serial connection of a reverse blocking diode and an inductor. For noise reduction a bypass capacitor is connected between the pair of outputs of the rectifier circuit and in parallel with the serial circuit of the inductor and the reverse blocking diode and at least part of the transformer primary and the smoothing capacitor. The bypass capacitor is less in capacitance than the smoothing capacitor.

10 Claims, 12 Drawing Sheets

LOW-NOISE SWITCHING POWER SUPPLY

BACKGROUND OF THE INVENTION

This invention relates to electric power supplies, and particularly to a switching power supply featuring provisions for attainment of high power factor with a minimum of noise production.

A conversion from an alternating to a direct current is possible by a rectifying and smoothing circuit comprising a rectifying circuit including a diode and connected to an a.c. power supply, and a smoothing circuit including a capacitor and connected to the rectifying circuit. The rectifying and smoothing circuit possesses the disadvantage, however, of being low in power factor as a result of the fact that the smoothing capacitor is charged only at and adjacent the peaks of the a.c. voltage of sinusoidal waveform. Another drawback is that it is incapable of adjustably varying the d.c. output voltage.

Japanese Unexamined Patent Publication No. 8-154379 represents an improvement of the rectifying and smoothing circuit above. It teaches a switching power supply comprising a rectifying circuit, a smoothing capacitor, a d.c.-to-d.c. converter circuit, and an inductive reactor for a higher power factor. The reactor is electrically connected between the pair of output terminals of the rectifying circuit upon closure of a switch included in the d.c.-to-d.c. converter circuit. The desired improvement in power factor is attained as the current flowing through the reactor varies in amplitude in step with the a.c. input voltage.

This prior art switching power supply has proved to have its own shortcomings. Each time the switch of the d.c.-to-d.c. converter circuit opens, the inductor releases the energy that has been stored thereon, with the result that the current flows through the rectifying circuit for charging the smoothing capacitor. The rectifying circuit includes a diode as aforesaid, to which diode the current due to the energy release from the reactor flows at a repetition rate of as high as 20 to 150 kilohertz. Abrupt changes in the magnitude of the current flowing through the diode are known to give rise to noise with a frequency much higher than that at which the switch is turned on and off. A noise filter, sometimes referred to as line filter, has conventionally been connected between the a.c. input terminals and the rectifying circuit in order to prevent the leakage of the high frequency noise produced by the rectifying circuit and by the d.c.-to-d.c. converter circuit.

The trouble has been the high-frequency noise due to the diode of the rectifying circuit. The total resulting noise has been of annoyingly high level, requiring the provision of several noise filters which have added substantively to the size and manufacturing cost of this type of switching power supply.

SUMMARY OF THE INVENTION

The present invention seeks to minimize the noise production of switching power supplies of the kind defined, without in any way adversely affecting their power factor in so doing.

Briefly, the invention may be summarized as a switching power supply capable of translating a.c. voltage into d.c. voltage, comprising a pair of a.c. input terminals for inputting a.c. voltage, a pair of d.c. output terminals for outputting d.c. voltage, a rectifier circuit connected to the pair of input terminals, a transformer having a winding, a rectifying and smoothing circuit connected between the transformer and the pair of d.c. output terminals, an inductor for improvement of the power factor of the input terminals, a reverse blocking diode, a smoothing capacitor connected between the pair of outputs of the rectifier circuit via at least part of the transformer winding, the reverse blocking diode and the inductor, a switch connected between the pair of outputs of the rectifier circuit via at least the inductor and the reverse blocking diode and in parallel with the smoothing capacitor via at least part of the transformer winding, a switch control circuit connected to the switch for on-off control of the switch at a repetition frequency higher than the frequency of the a.c. input voltage, and a bypass capacitor. The bypass capacitor is connected between the pair of outputs of the rectifier circuit and in parallel with the serial circuit of the inductor and the reverse blocking diode and at least part of the transformer winding and the smoothing capacitor. The bypass capacitor is less in capacitance than the smoothing capacitor. The reverse blocking diode has a reverse recovery time shorter than the nonconducting periods of the switch, The invention particularly features the bypass capacitor, with a capacitance less than that of the smoothing capacitor, which is connected between the pair of outputs of the rectifier circuit. Consequently, unlike the prior art, the current due to energy release from the inductor during the nonconducting periods of the switch does not flow through the rectifier circuit, but through the bypass capacitor taught by the invention. High frequency noise production by the rectifier circuit is avoided as the intermittent current flow through the diode of the rectifier circuit is prevented as above.

The bypass capacitor is so connected, as summarized above, that at least part of the transformer winding is interposed between the inductor and the smoothing capacitor. The smoothing capacitor can then be charged with a relatively low voltage and so need not be of expensive construction for withstanding high voltages.

For further noise reduction an additional capacitor may be connected in parallel with the switch at least via the reverse blocking diode, and with the bypass capacitor via the inductor. This additional capacitor will redound for reduction of high frequency noise due to the operation of the switch.

The above and other objects, features and advantages of this invention will become more apparent, and the invention itself will best be understood, from a study of the following description and appended claims, with reference had to the attached drawings showing the preferred embodiments of the invention.

DESCRIPTION OF THE PREFERRED EMBODIMENTS

Figure 1:
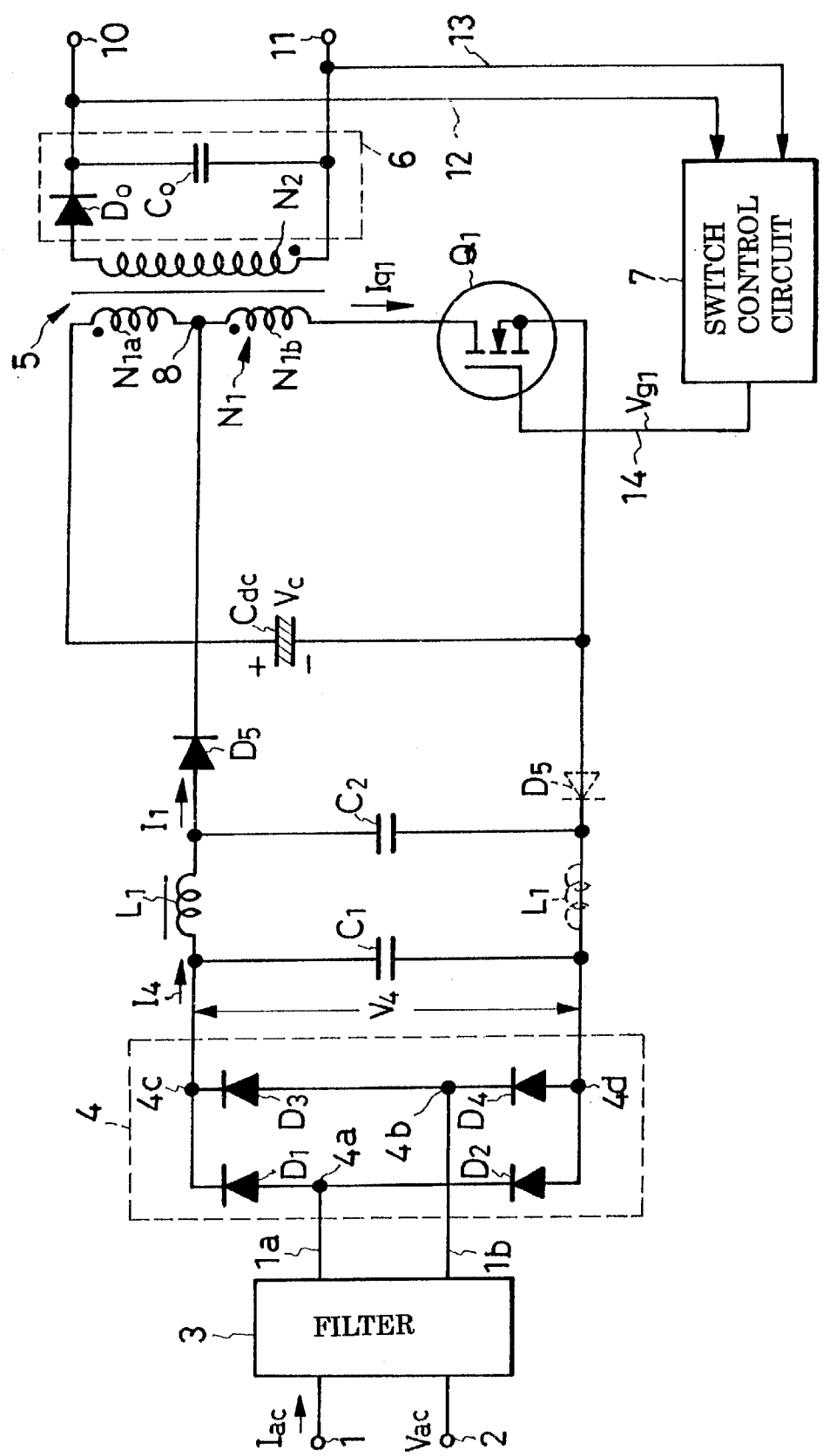
FIG. 1 is a schematic electrical diagram, partly in block form, of the switching power supply constructed according to the novel concepts of the present invention.

The switching power supply shown in FIG. 1 by way of a preferable embodiment of the invention has a pair of input terminals 1 and 2 which are to be connected to a source, not shown, of commercial alternating current with a frequency of, for instance, 50 Hz. A noise filter 3 is connected to this pair of input terminals 1 and 2.

Figure 2:
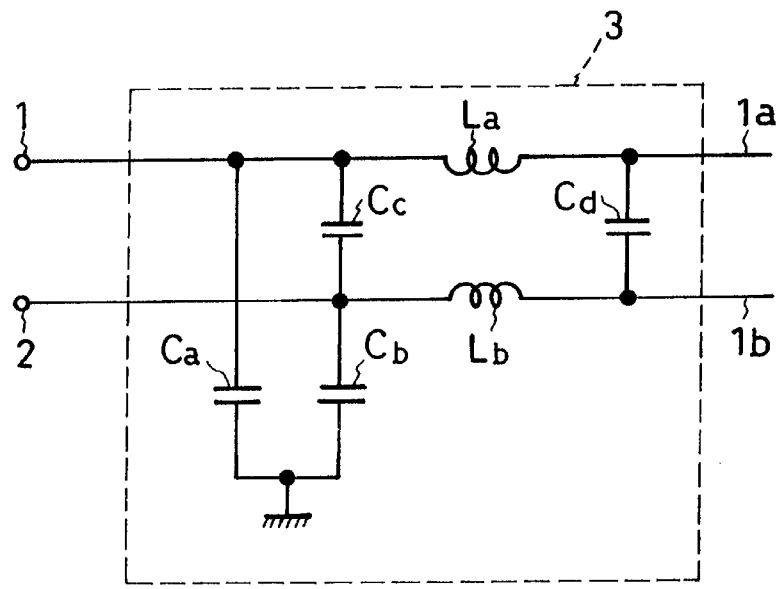
FIG. 2 is a schematic electrical diagram of the noise filter included in the FIG. 1 power supply.

As shown in detail in FIG. 2, the noise filter 3 comprises two capacitors $C_a$ and $C_b$ connected respectively between the input terminals 1 and 2 and the ground, another capacitor $C_c$ connected between these input terminals, two inductors $L_a$ and $L_b$ connected respectively to the input terminals 1 and 2 via the a.c. conductors $1_a$ and $1_b$, and still another capacitor $C_d$ connected between these a.c. conductors.

Referring back to FIG. 1, the noise filter 3 of the foregoing construction is connected by way of the pair of a.c. conductors $1_a$ and $1_b$ to a bridge rectifier circuit 4 having four diodes $D_1$, $D_2$, $D_3$ and $D_4$ in bridge connection. A junction $4_a$ between the diodes $D_1$ and $D_2$ is connected to the first a.c. input conductor $1_a$ by way of a first input of this rectifier circuit 4, and a junction $4_b$ between the diodes $D_3$ and $D_4$ to the second a.c. input conductor $1_b$ by way of a second input. The first output, then, of the rectifier circuit 4 is a junction $4_c$, between the diodes $D_1$ and $D_3$, and the second output thereof a junction $4_d$ between the diodes $D_2$ and $D_4$. All that is required for the diodes $D_1$–$D_4$ is to rectify the 50 Hz a.c. voltage, it being unnecessary for them to turn on and off in response to the switching of this power supply.

The pair of outputs $4_c$, and $4_d$ of the rectifier circuit 4 are connected to a transformer 5 via an inductor $L_1$, a bypass capacitor $C_1$, another capacitor $C_2$ for elimination of the high frequency component, a reverse blocking diode $D_5$, and a semiconductor switch $Q_1$. The transformer 5 has a primary winding $N_1$, and a secondary winding $N_2$ which are electromagnetically coupled together, and a magnetic core. The transformer primary $N_1$, is center tapped at 8 and thereby divided into two parts $N_{1a}$ and $N_{1b}$. The transformer primary $N_1$, and secondary $N_2$ are opposite in polarization, as indicated by the dots in FIG. 1.

The smoothing capacitor $C_{dc}$, preferably an electrolytic capacitor, has one of its opposite polarity terminals connected to the first output $4_c$, of the rectifier circuit 4 via the transformer primary first part $N_{1a}$, reverse blocking diode $D_5$ and inductor $L_1$. The other terminal of the smoothing capacitor $C_{dc}$ is connected to the second output $4_d$ of the rectifier circuit 4. Notwithstanding the solid-line showing of FIG. 1, however, the inductor $L_1$ and reverse blocking diode $D_5$ could be connected between the second mentioned terminal of the smoothing capacitor $C_{dc}$ and the second output $4_d$ of the rectifier circuit 4, as indicated by the broken lines in the same figure.

Shown as an insulated gate field effect transistor, the switch $Q_1$ is connected in parallel with the smoothing capacitor $C_{dc}$ via the transformer primary $N_1$. Additionally, the switch $Q_1$ is connected to the first rectifier output $4_c$, via the transformer primary second part $N_{1b}$, reverse blocking diode $D_5$ and inductor $L_1$ on one hand and, on the other hand, directly to the second rectifier output $4_d$. The reverse blocking diode $D_5$ is designed to go on and off in synchronism with the switch $Q_1$, with a reverse recovery time shorter than each nonconducting period of the switch $Q_1$.

The transformer secondary $N_2$ has its opposite extremities connected respectively to the pair of output terminals 10 and 11 via a rectifying and smoothing circuit 6. The rectifying and smoothing circuit 6 comprises a rectifying diode $D_0$ and a smoothing capacitor $C_0$. Connected between one extremity of the transformer secondary $N_2$ and the output terminal 10, the rectifying diode $D_0$ is so oriented as to be conductive when the switch $Q_1$ is off, and nonconductive when the switch $Q_1$ is on. The capacitor $C_0$ is connected in parallel with the transformer secondary $N_2$ via the diode $D_0$. A unidirectional output voltage is thus obtained between the pair of output terminals 10 and 11 for feeding a load, not shown, connected thereto.

The present invention particularly features the bypass capacitor $C_1$ connected between the outputs $4_c$, and $4_d$ of the rectifier circuit 4. The bypass capacitor $C_1$ is less, preferably not more than one hundredth, in capacitance than the smoothing capacitor $C_{dc}$. With such small capacitance, the bypass capacitor $C_1$ is practically incapable of smoothing the output from the rectifier circuit 4; instead, the voltage across this capacitor $C_1$ changes with the output from the rectifier circuit 4.

In order to filter out the high frequency component of the incoming supply current, the capacitor $C_2$ is connected in parallel with the bypass capacitor $C_1$ via the inductor $L_1$ and, additionally, in parallel with the switch $Q_1$ via the reverse blocking diode $D_5$ and transformer primary second part $N_{1b}$. Much less in capacitance than the smoothing capacitor $C_{dc}$ or the bypass capacitor $C_1$, the capacitor $C_2$ is designed to absorb the high frequency noise that may be caused by the switch $Q_1$, diodes $D_0$ and $D_5$, etc., on the output side of that capacitor $C_1$.

As shown also in FIG. 1, a switch control circuit 7 has inputs connected to the pair of output terminals 10 and 11 via conductors 12 and 13, respectively, and an output connected to the control terminal of the switch $Q_1$ via a conductor 14. The switch control circuit 7 is designed to turn the switch $Q_1$ on and off with a repetition frequency required to keep the voltage between the pair of output terminals 10 and 11 at a required value.

Figure 3:
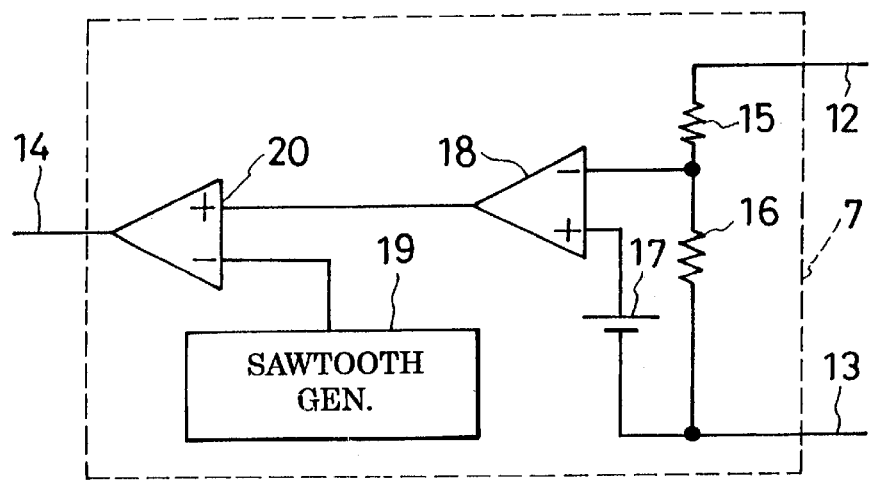
FIG. 3 is a schematic electrical diagram of the switch control circuit included in the FIG. 1 power supply.

FIG. 3 is a more detailed illustration of the switch control circuit 7. Included is a serial connection of two voltage dividing resistors 15 and 16 connected between the pair of input conductors 12 and 13. The junction between the resistors 15 and 16 is connected to one input of a differential amplifier 18, the other input of which is connected o a reference voltage source 17. The output of the differential amplifier 18 is connected to one input of a comparator 20, the other input of which is connected to a sawtooth generator circuit 19. The output of the comparator 20 is connected to the control terminal of the switch $Q_1$, FIG. 1, by way of the output conductor 14.

The sawtooth generator 19 puts out a sawtooth voltage with a frequency (e.g. 20 kHz) that is higher than the frequency (e.g. 50 Hz) of the a.c. voltage $V_{ac}$ between the pair of input terminals 1 and 2. Thus the comparator 20 puts out a series of duration modulated switch control pulses in synchronism with the sawtooth voltage, making on-off control of the switch $Q_1$ accordingly. As required or desired, the differential amplifier 18 and the comparator 20 may be coupled photoelectrically, as by a light emitting diode and phototransistor, instead of directly as in FIG. 3.

Operation

In use the pair of a.c. input terminals 1 and 2 are to be connected to an unshown source of a.c. power, and the pair of d.c. output terminals 10 and 11 to an unshown load. The smoothing capacitor $C_{dc}$ will be charged to the desired d.c. voltage $V_c$. The resulting steady state operation of this representative switching power supply will be discussed hereinbelow with reference to FIG. 4 which shows he waveforms appearing in various parts of FIG. 1.

Figure 4:
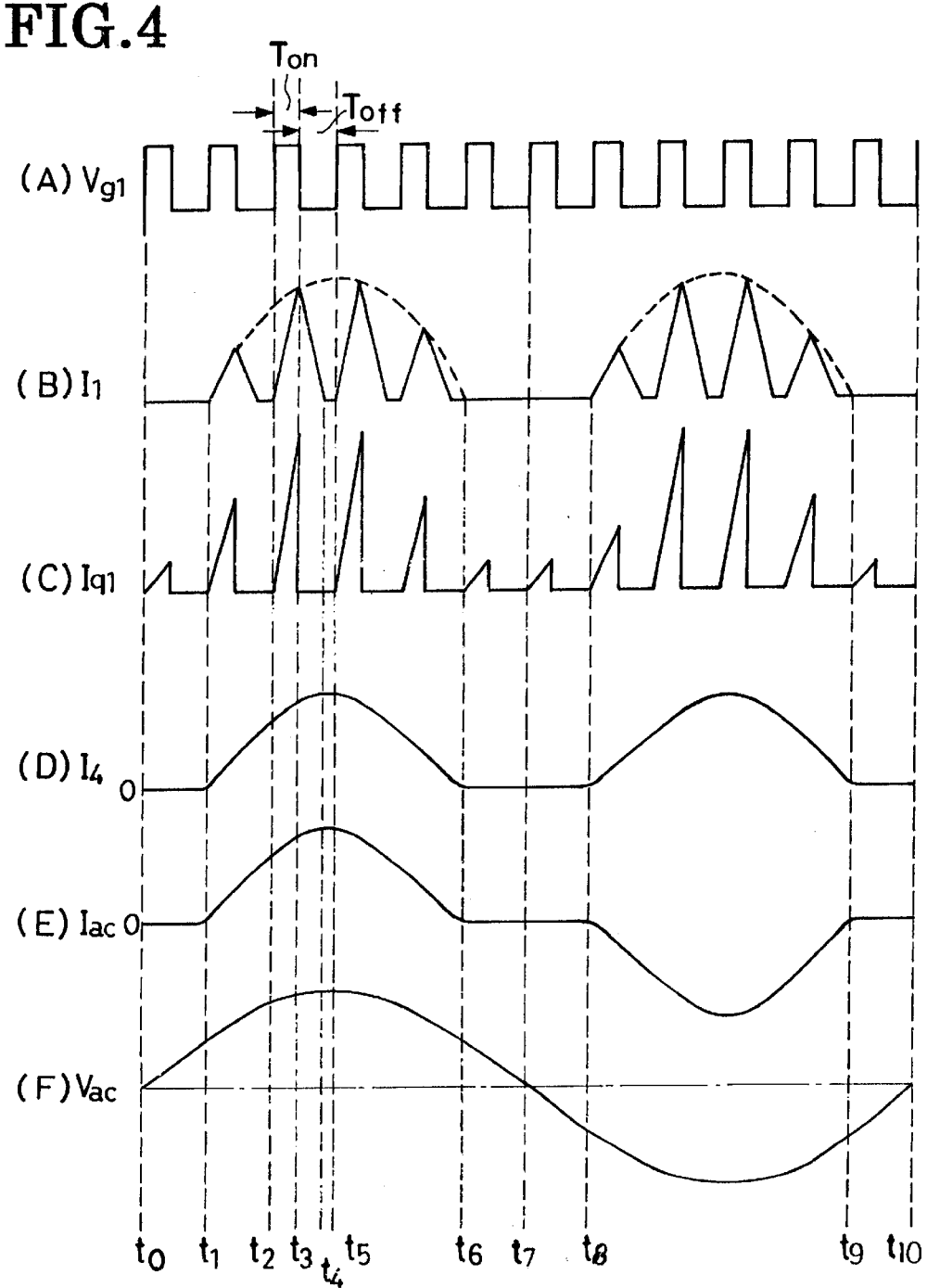
FIG. 4, consisting of (A) through (F), is a series of waveforms useful in explaining the operation of the FIG. 1 power supply.

At (A) in FIG. 4 is shown a series of switch control pulses $V_{g1}$ impressed to the control terminal of the switch $Q_1$ for its on-off control. During each conducting period $T_{on}$ of the switch $Q_1$, as from $t_2$ to $t_3$ in FIG. 4, current will flow through a first path comprising the first rectifier output $4_c$, inductor $L_1$, reverse blocking diode $D_5$, transformer primary second part $N_{1b}$, switch $Q_1$, and second rectifier output $4_d$, as well as through a second path comprising the smoothing capacitor $C_{dc}$, transformer primary $N_1$, and switch $Q_1$. Consequently, there flows through the conducting switch $Q_1$ the resultant of the current that flowed through the inductor $L_1$ and the current that came from the smoothing capacitor $C_{dc}$. This combined current flowing through the switch $Q_1$ is shown at (C) in FIG. 4 and therein designated $I_{q1}$. Energy is stored on both inductor $L_1$ and transformer 5 during each such conducting period $T_{on}$ of the switch $Q_1$.

The switch $Q_1$ is shown to go off at $t_3$ in FIG. 4 and remain so until $t_5$. During each such nonconducting period $T_{off}$ of the switch $Q_1$, when the switch current $I_{q1}$, is zero as at (C) in FIG. 4, the reverse blocking diode $D_5$ is conductive as long as its anode potential is higher than the cathode potential. A current flows therefore through the path comprising the first rectifier output $4_c$, inductor $L_1$, reverse blocking diode $D_5$, transformer primary first part $N_{1a}$, smoothing capacitor $C_{dc}$, and second rectifier output $4_d$, charging the capacitor $C_{dc}$. Also, during each such nonconducting period $T_{off}$, the energy that has been stored on the inductor $L_1$ will be released, with the result that the current $I_1$ flowing through this inductor dwindles with time, as at (B) in FIG. 4, until it becomes zero at $t_4$ which is shortly before $t_5$. The transformer 5 also releases its energy storage during the nonconducting period $T_{off}$, causing a voltage to be developed across the transformer secondary $N_2$ with the consequent conduction of the diode $D_0$. The conduction of the diode $D_0$ results in turn in current flow through the path comprising the transformer secondary $N_2$, diode $D_0$, capacitor $C_0$, and load. The voltage across the capacitor $C_0$ clamps the transformer secondary $N_2$ during the conduction of the diode $D_0$, so that a voltage is induced across the transformer primary $N_1$, with a magnitude depending upon the ratio of the turns of the transformer windings. This voltage is of the same orientation as the voltage $V_c$ across the smoothing capacitor $C_{dc}$. The voltage $V_c$ is defined as:

$$V_c = V_4 + V_{L1} - V_{N1a}$$

where
 $V_4$=the output voltage of the rectifier circuit 4,
 $V_{L1}$=the voltage across the inductor $L_1$,
 $V_{N1a}$=the voltage across the first part $N_{1a}$ of the transformer primary $N_1$.

The smoothing capacitor $C_{dc}$ is charged to a voltage as low as less than the sum of the rectifier output voltage $V_4$ and the inductor voltage $V_{L1}$. The current ceases to flow through the reverse blocking diode $D_5$ at $t_4$ in FIG. 4 when the inductor $L_1$ completes its energy release. However, the current $I_4$ from the rectifier circuit 4 is not cut off at this moment by reason of the connection of the bypass capacitor $C_1$ and the high frequency component elimination capacitor $C_2$ between the pair of rectifier outputs $4_c$ and $4_d$. The rectifier output current $I_4$ continues to flow into these capacitors $C_1$ and $C_2$ during the ensuing $t_4$–$t_5$ period.

The rectifier output current $I_4$ is depicted idealized (i.e. without ripple) at (D) in FIG. 4. Both this rectifier output current $I_4$ and the a.c. input current $I_{ac}$, at (E) in FIG. 4, flow during the $t_1$–$t_6$ period of the first 180 electrical degrees, from $t_0$ to $t_7$, of the a.c. input voltage $V_{ac}$, at (F) in FIG. 4 and during the $t_8$–$t_9$ period of the second 180 electrical degrees, from $t_7$ to $t_{10}$, of the a.c. input voltage $V_{ac}$. Both inductor current $I_1$, and rectifier output current $I_4$ vary in amplitude with the a.c. input voltage $V_{ac}$ and flow during the relatively long periods of from $t_1$ to $t_6$ and from $t_8$ to $t_9$, resulting in close approximation of the current waveform $I_{ac}$ at the a.c. input terminals 1 and 2 to a sinusoidal wave and in improvement in power factor.

The output from the differential amplifier 18, FIG. 3, of the switch control circuit 7 will lower when the output voltage of the FIG. 1 power supply rises above the desired value. The output pulses of the comparator 20 will then shorten in duration, only to an extent necessary to return the output voltage to normal. Conversely, upon decrease in the power supply output voltage, the output from the differential amplifier 18 will rise, making the comparator output pulses longer in duration, until the output voltage returns to normal.

The advantages gained by this embodiment of the invention may be recapitulated as follows:

1. The current due to energy release by the inductor $L_1$, which is provided for improvement of power factor, flows through the circuit comprising the inductor $L_1$, transformer primary first part $N_{1a}$, smoothing capacitor $C_{dc}$ and bypass capacitor $C_1$, but not through the rectifier circuit 4. The current of the four diodes $D_1$–$D_4$ of the rectifier circuit 4 has a low frequency (e.g. 50 Hz) in synchronism with the a.c. input voltage $V_{ac}$, as indicated at (D) in FIG. 4, so that these diodes do not produce noise having frequencies equal to the switching frequency or even higher. The noise filter 3 can therefore be of no such inconveniently large size as has been required heretofore.

2. The switch $Q_1$ combines the functions of switching the voltage applied to the transformer primary $N_1$, for d.c.-to-d.c. conversion and of switching the current flowing to the inductor $L_1$ for improvement of the power factor.

3. The inductor $L_1$ is connected to the smoothing capacitor $C_{dc}$ not directly but via the first part $N_{1a}$ of the transformer primary $N_1$, so that the voltage $V_c$ for charging the smoothing capacitor can be lower than the sum of the output voltage $V_4$ of the rectifier circuit 4 and the voltage $V_{L1}$ across the inductor $L_1$. The smoothing capacitor $C_{dc}$ need not be of expensive make capable of withstanding high voltages.

Figure 5:
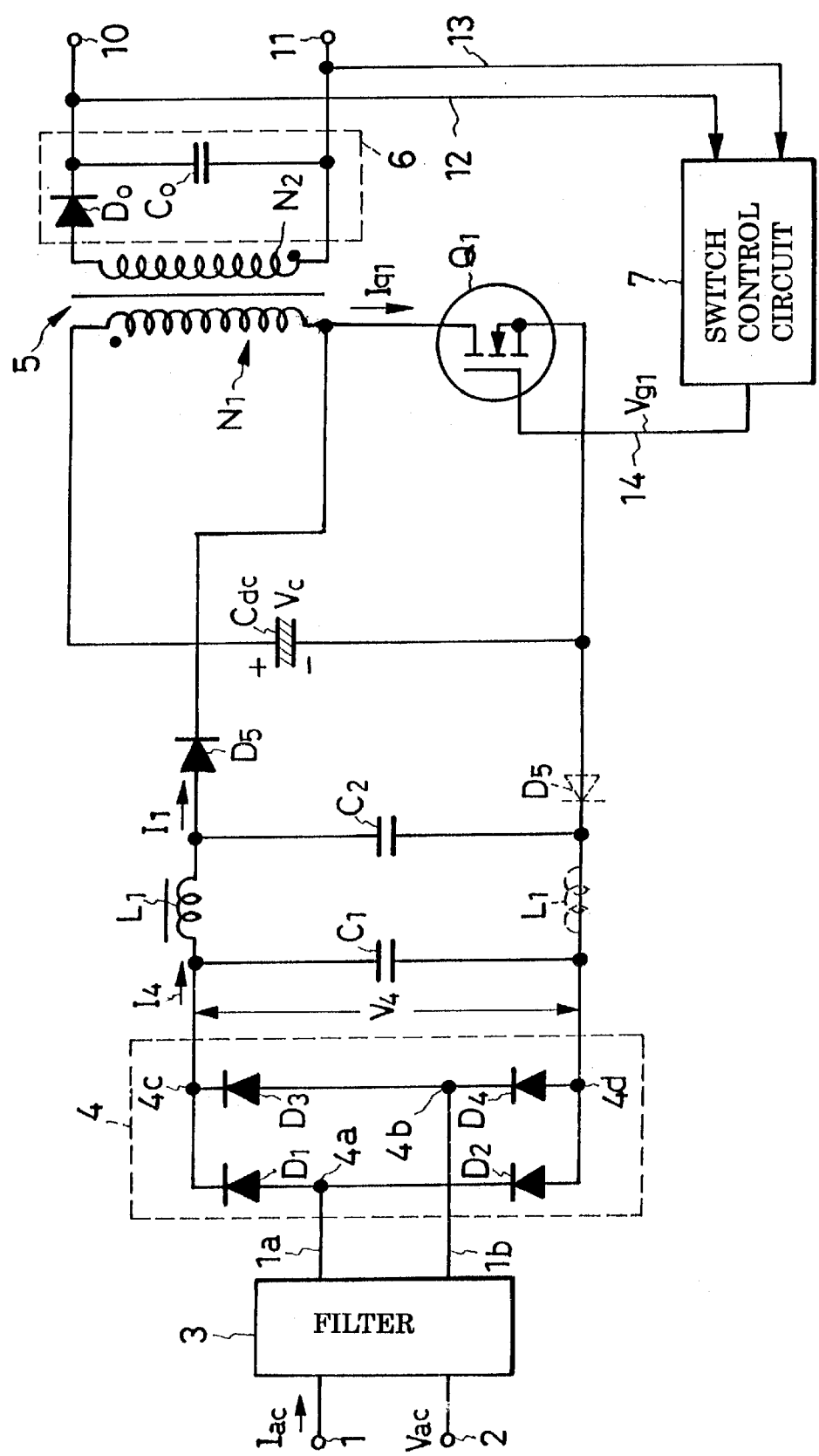
FIG. 5 is a diagram similar to FIG. 1 but showing a second preferred form of switching power supply according to the invention.

Embodiment of FIG. 5

The switching power supply of FIG. 5 differs from that of FIG. 1 in that the transformer primary $N_1$, is untapped, and that the inductor $L_1$ is connected via the reverse blocking diode $D_5$ to the junction between transformer primary $N_1$ and the drain of the FET switch $Q_1$. All the other details of construction of the FIG. 5 power supply are as previously set forth with reference to FIGS. 1–3.

Thus the FIG. 5 power supply is so modified that no part of the transformer primary $N_1$, intervenes between inductor $L_1$ and switch $Q_1$ The current $I_1$ flowing through the inductor $L_1$ during the conducting periods of the switch $Q_1$ is of greater magnitude than in the FIG. 1 embodiment, realizing further improvement in power factor. An additional advantage is that a materially less voltage is needed for charging the capacitor $C_{dc}$ as the transformer primary $N_1$, wholly exists between inductor $L_1$ and capacitor $C_{dc}$. The noise reduction capability of this modified power supply is the same as that of the FIG. 1 embodiment.

Figure 6:
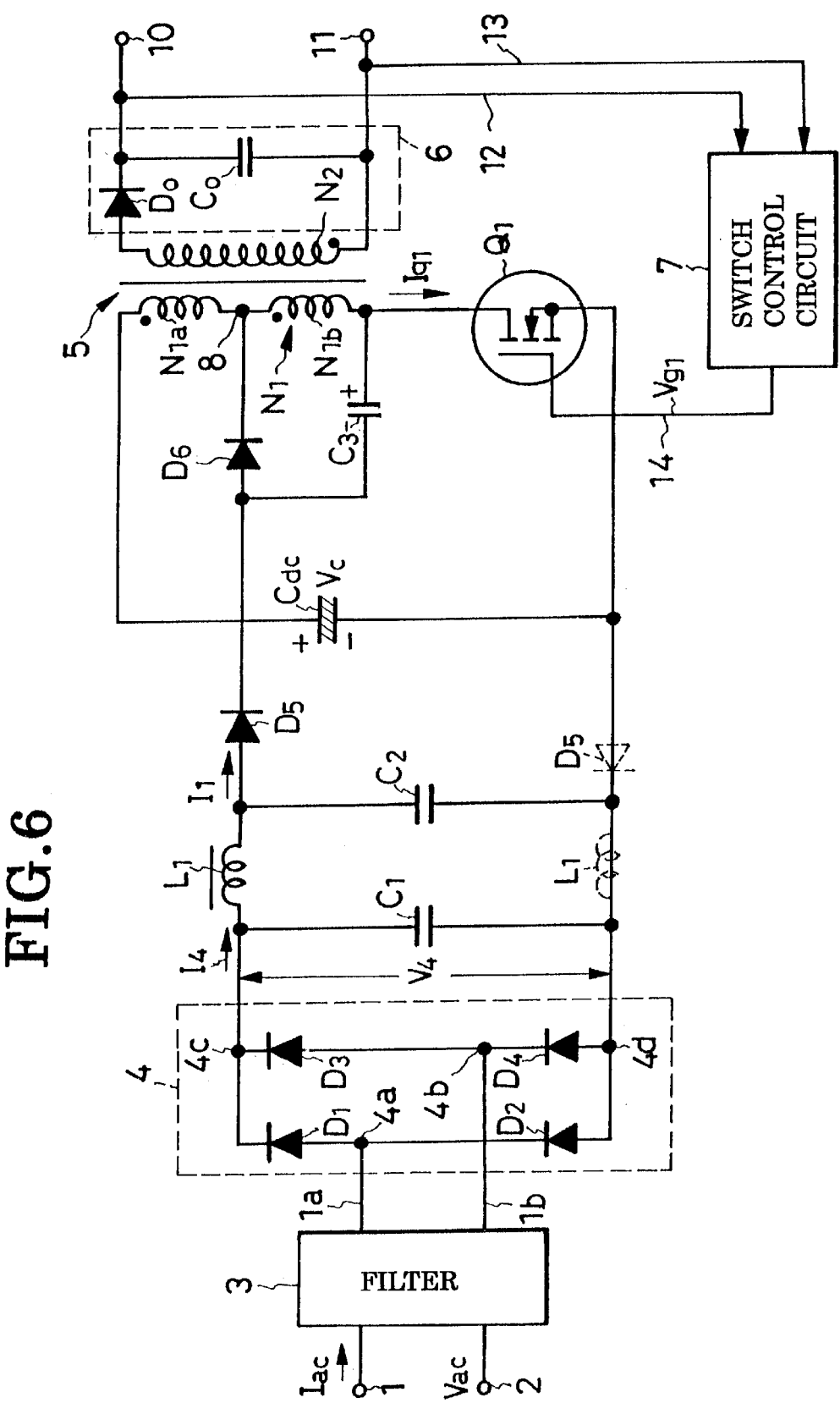
FIG. 6 is a diagram similar to FIG. 1 but showing a third preferred form of switching power supply according to the invention.

Embodiment of FIG. 6

The device of FIG. 6 differs from that of FIG. 1 only in additionally comprising a capacitor $C_3$ and a diode $D_6$. The capacitor $C_3$ is connected between reverse blocking diode $D_5$ and the junction between the transformer primary $N_1$, and the drain of the FET switch $Q_1$ for use as a bias power supply. The diode $D_6$ is connected between the capacitor $C_3$ and the tap 8 on the transformer primary $N_1$, and is so oriented that the capacitor $C_3$ will be charged with the polarity indicated in FIG. 6.

Such being the modified construction of the FIG. 6 switching power supply, the capacitor $C_3$ will be charged due to the voltage developing across the transformer primary $N_1$ during the nonconducting periods of the switch $Q_1$, that is, by the current flowing through the path comprising the transformer primary second part $N_{1b}$, capacitor $C_3$. and diode $D_6$. During the conducting periods of the switch $Q_1$, on the other hand, the current $I_{q1}$ will flow through the path comprising the rectifier circuit 4, inductor $L_1$, reverse blocking diode $D_5$, biasing capacitor $C_3$, and switch $Q_1$ The current $I_{q1}$ will be of relatively great magnitude even when the sinusoidal output voltage from the rectifier circuit 4 is relatively low, because the voltage across the biasing capacitor $C_3$ is added to the rectifier output voltage $V_4$. Remarkable improvement can therefore be made in power factor.

Figure 7:
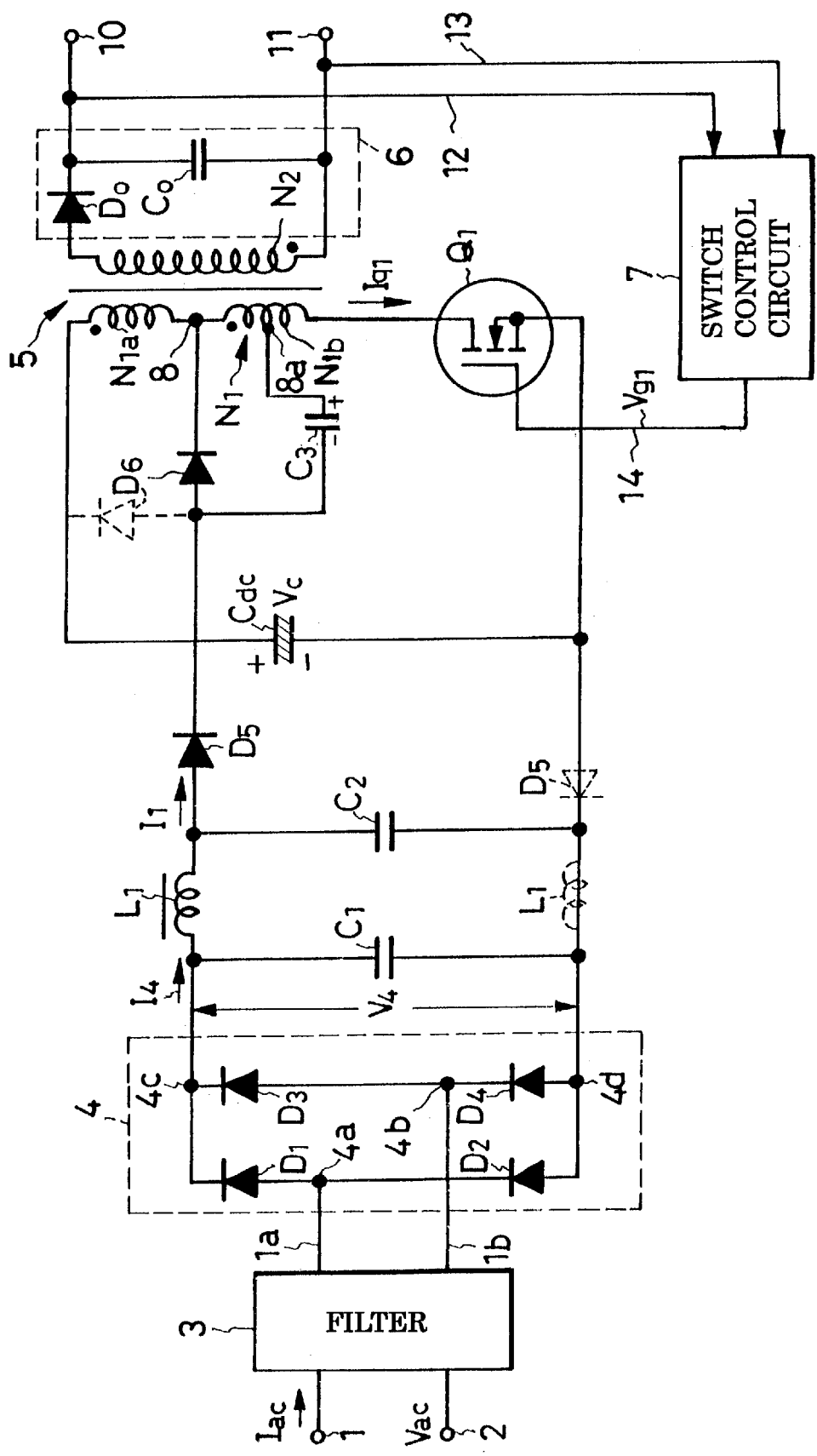
FIG. 7 is a diagram similar to FIG. 1 but showing a fourth preferred form of switching power supply according to the invention.

Embodiment of FIG. 7

The biasing capacitor $C_3$ need not be connected to the junction between transformer primary $N_1$ and switch $Q_1$ as in FIG. 6 but, as indicated in FIG. 7, to a tap $8_a$ on the second part $N_{1b}$ of the transformer primary $N_1$. This FIG. 7 embodiment is akin to that of FIG. 6 in all the other details of construction.

The position of the tap $8a$ on the transformer primary second part $N_{1b}$ is variable for adjustment of the voltage across the biasing capacitor $C_3$, of the magnitude of the current $I_{q1}$ during the conducting periods of the switch $Q_1$, and of the voltage for charging the smoothing capacitor $C_{dc}$ during the nonconducting periods of the switch $Q_1$. As an additional modification of this FIG. 7 device, the diode $D_6$ could be connected between the capacitor $C_3$ and the junction between the smoothing capacitor $C_{dc}$ and the transformer primary $N_1$ as indicated by the broken lines in this figure.

Figure 8:
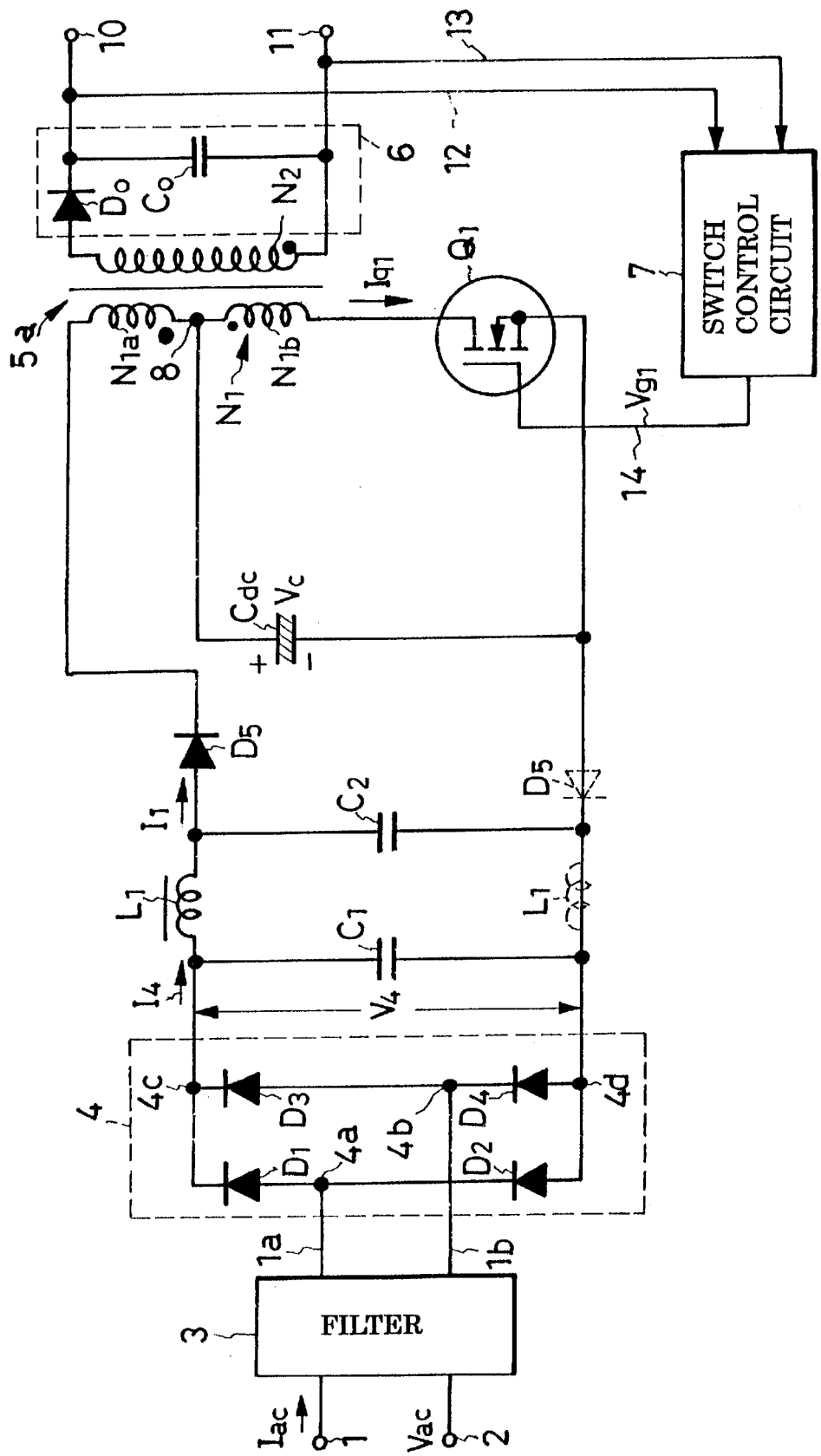
FIG. 8 is a diagram similar to FIG. 1 but showing a fifth preferred form of switching power supply according to the invention.

Embodiment of FIG. 8

The transformer 5 of the FIG. 1 embodiment may be modified as shown at $5_a$ in FIG. 8. The modified transformer $5_a$ differs from its FIG. 1 counterpart 5 in that the first part $N_{1a}$ of the primary winding $N_1$, of the transformer $5_a$ is opposite in polarization to that of the primary winding of the transformer 5. In conformity with this change in polarities the smoothing capacitor $C_{dc}$ is connected to the tap 8, with the result that a serial connection of the transformer primary second part $N_{1b}$ and switch $Q_1$ is connected in parallel with the smoothing capacitor $C_{dc}$. The reverse blocking diode $D_5$ has its cathode connected to the smoothing capacitor $C_{dc}$ via the transformer primary first part $N_{1a}$. Also, between the pair of outputs $4_c$, and $4_d$ of the rectifier circuit 4, there is connected a serial network of the inductor $L_1$, reverse blocking diode $D_5$, transformer primary $N_1$, and switch $Q_1$.

The desired improvement in power factor is attained as current flows during the conducting periods of the switch $Q_1$, through the path comprising the rectifier circuit 4, inductor $L_1$, diode $D_5$, transformer primary $N_1$, and switch $Q_1$, as well as through the path comprising the smoothing capacitor $C_{dc}$, transformer primary second part $N_{1b}$, and switch $Q_1$. The energy that has been stored on the transformer during each conducting period of the switch $Q_1$ is released upon opening of the switch, causing conduction through the diode $D_0$ of the rectifying and smoothing circuit 6. The energy that has been stored on the inductor $L_1$, on the other hand, is released through the path comprising the inductor $L_1$, diode $D_5$, transformer primary first part $N_{1a}$, smoothing capacitor $C_{dc}$, and bypass capacitor $C_1$, thereby charging the capacitor $C_{dc}$. The voltage across the transformer primary first part $N_{1a}$ is opposite in polarity to both the output voltage $V_4$ of the rectifier circuit 4 and the voltage $V_{L1}$ across the inductor $L_1$, the smoothing capacitor $C_{dc}$ is charged to a voltage less than the sum of these voltages $V_4$ and $V_{L1}$.

Figure 9:
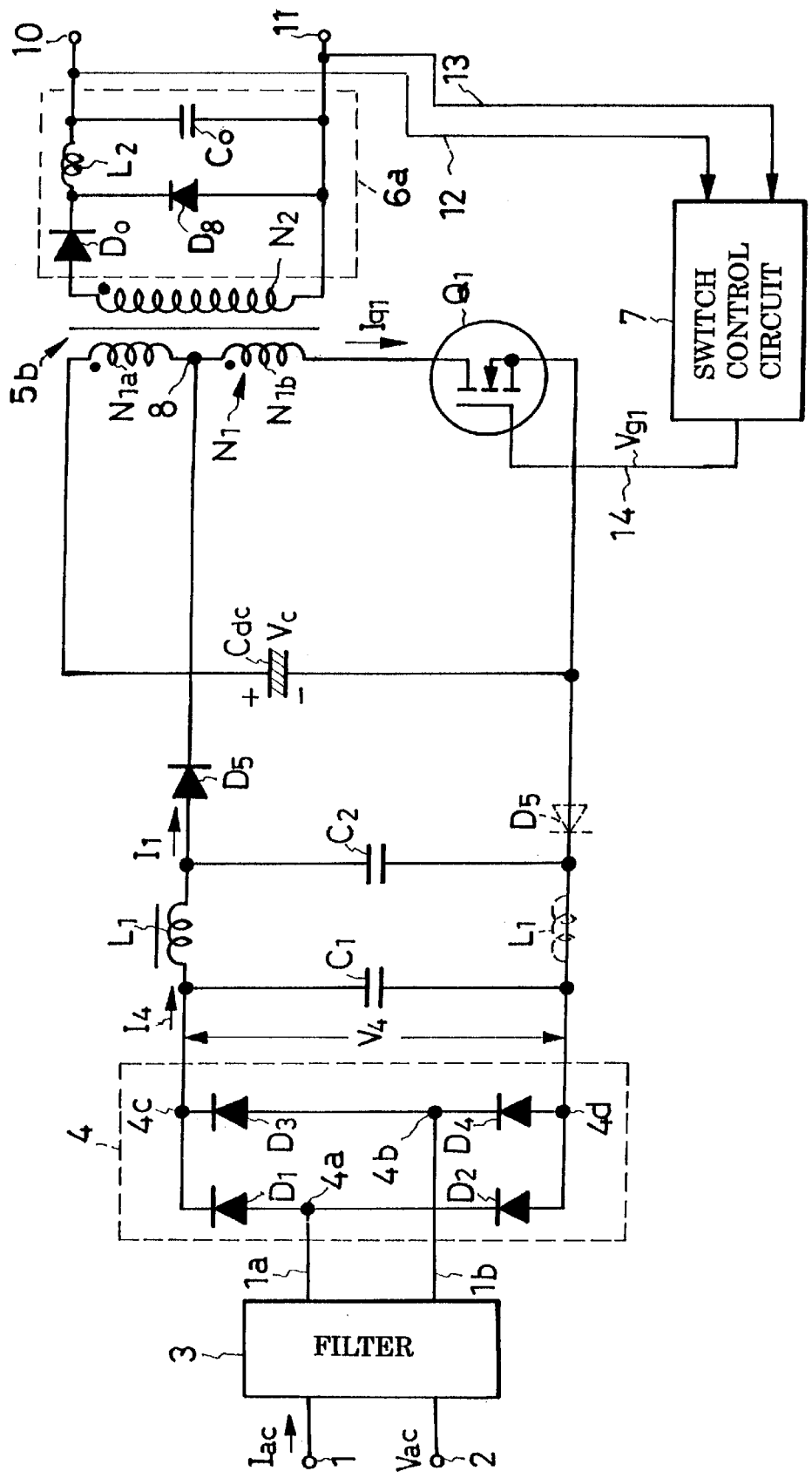
FIG. 9 is a diagram similar to FIG. 1 but showing a sixth preferred form of switching power supply according to the invention.

Embodiment of FIG. 9

The switching power supply of FIG. 9 incorporates another modified transformer $5_b$ and a modified rectifying and smoothing circuit $6_a$ but is akin to the FIG. 1 embodiment in all the other respects. The transformer $5_b$ has a primary winding $N_1$, and secondary winding $N_2$ of the same polarization, as indicated by the dots in this figure, so that a forward d.c.-to-d.c. converter is constituted of the transformer $5_b$, switch $Q_1$, and rectifying and smoothing circuit $6_a$. The rectifying and smoothing circuit $6_a$ is itself of conventional make comprising the diode $D_0$, smoothing inductor $L_2$, smoothing capacitor $C_0$, and commutation diode $D_8$. The diode $D_0$ conducts during the conducting periods of the switch $Q_1$.

Figure 10:
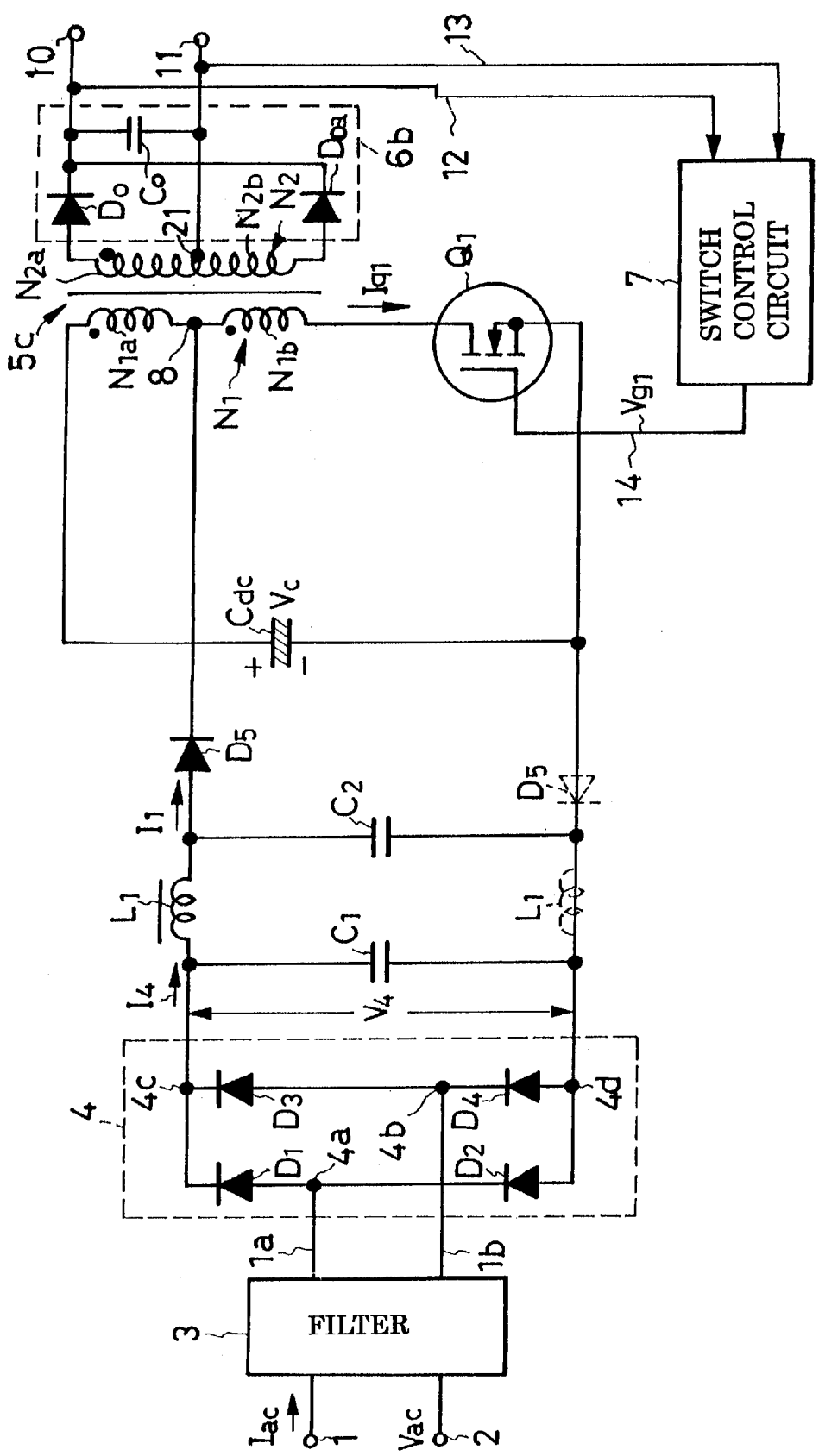
FIG. 10 is a diagram similar to FIG. 1 but showing a seventh preferred form of switching power supply according to the invention.

Embodiment of FIG. 10

Still another modified transformer $5_c$ and another modified rectifying and smoothing circuit $6_b$ are both incorporated in the device of FIG. 10, which is identical with the FIG. 1 device in all the other respects. The transformer $5_c$ differs from its FIG. 1 counterpart 5 in that not just the primary winding $N_1$, but the secondary winding $N_2$ too is center tapped, as at 21, and so divided into a pair of halves $N_{2a}$ and $N_{2b}$. The modified rectifying and smoothing circuit $6_b$ comprises two diodes $D_0$ and $D_{0a}$ and the capacitor $C_0$. The first half $N_{2a}$ of the transformer secondary $N_2$ is connected in parallel with the smoothing capacitor $C_0$ via the diode $D_0$, and the second half $N_{2b}$ in parallel with the smoothing capacitor $C_0$ via the other diode $D_{0a}$. As required, an inductor, not shown, may be connected between the diodes $D_0$ and $D_{0a}$ and the smoothing capacitor $C_0$.

Figure 11:
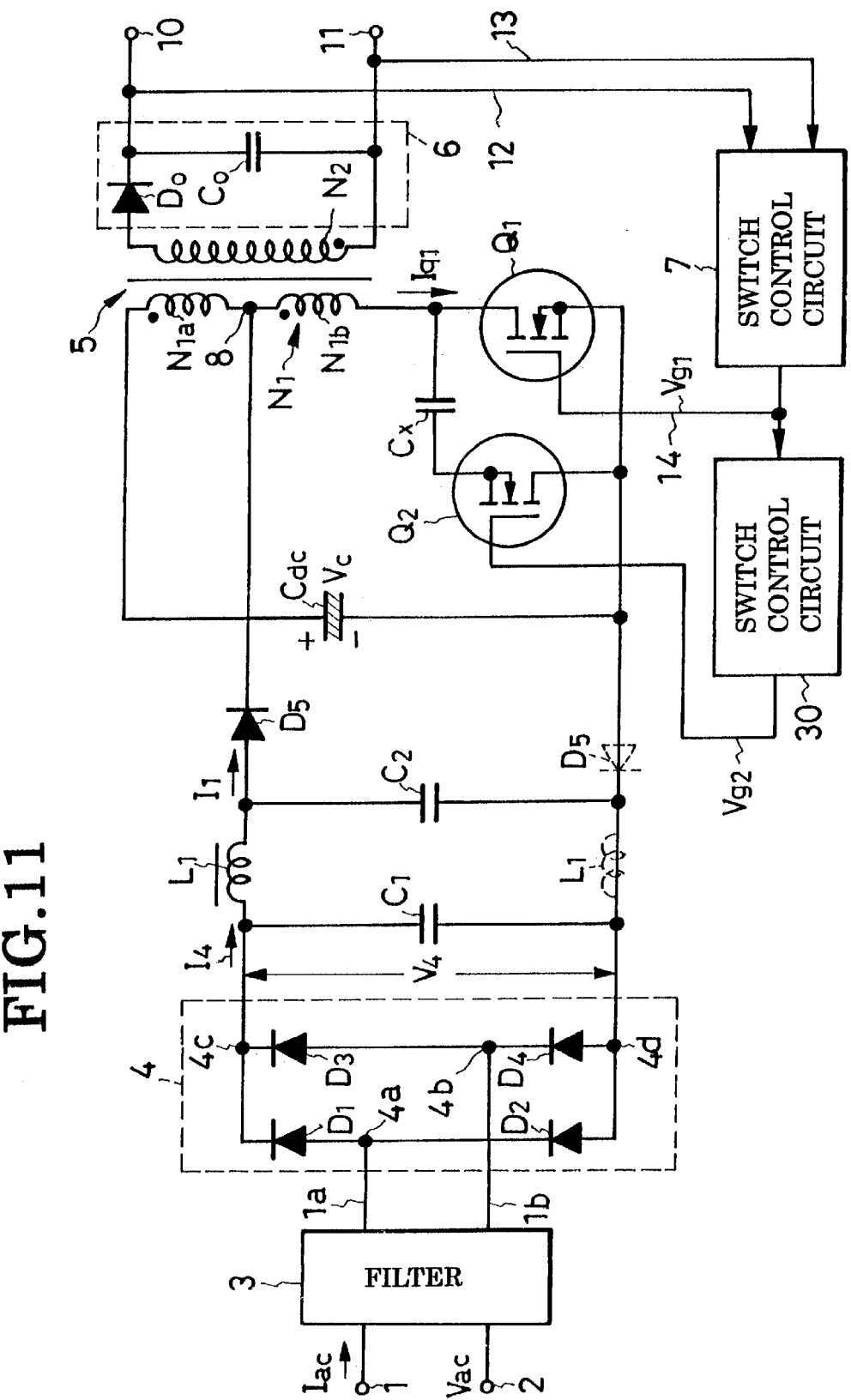
FIG. 11 is a diagram similar to FIG. 1 but showing an eighth preferred form of switching power supply according to the invention.
Figure 12:
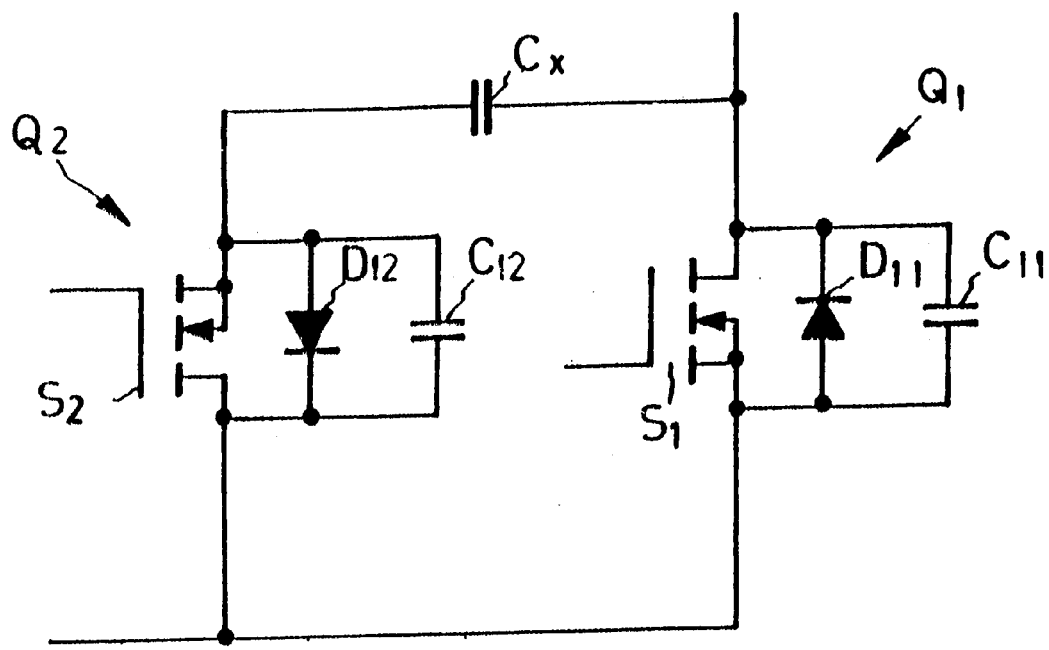
FIG. 12 is a schematic electrical diagram equivalently depicting in more detail the two switches included in the FIG. 11 power supply.
Figure 13:
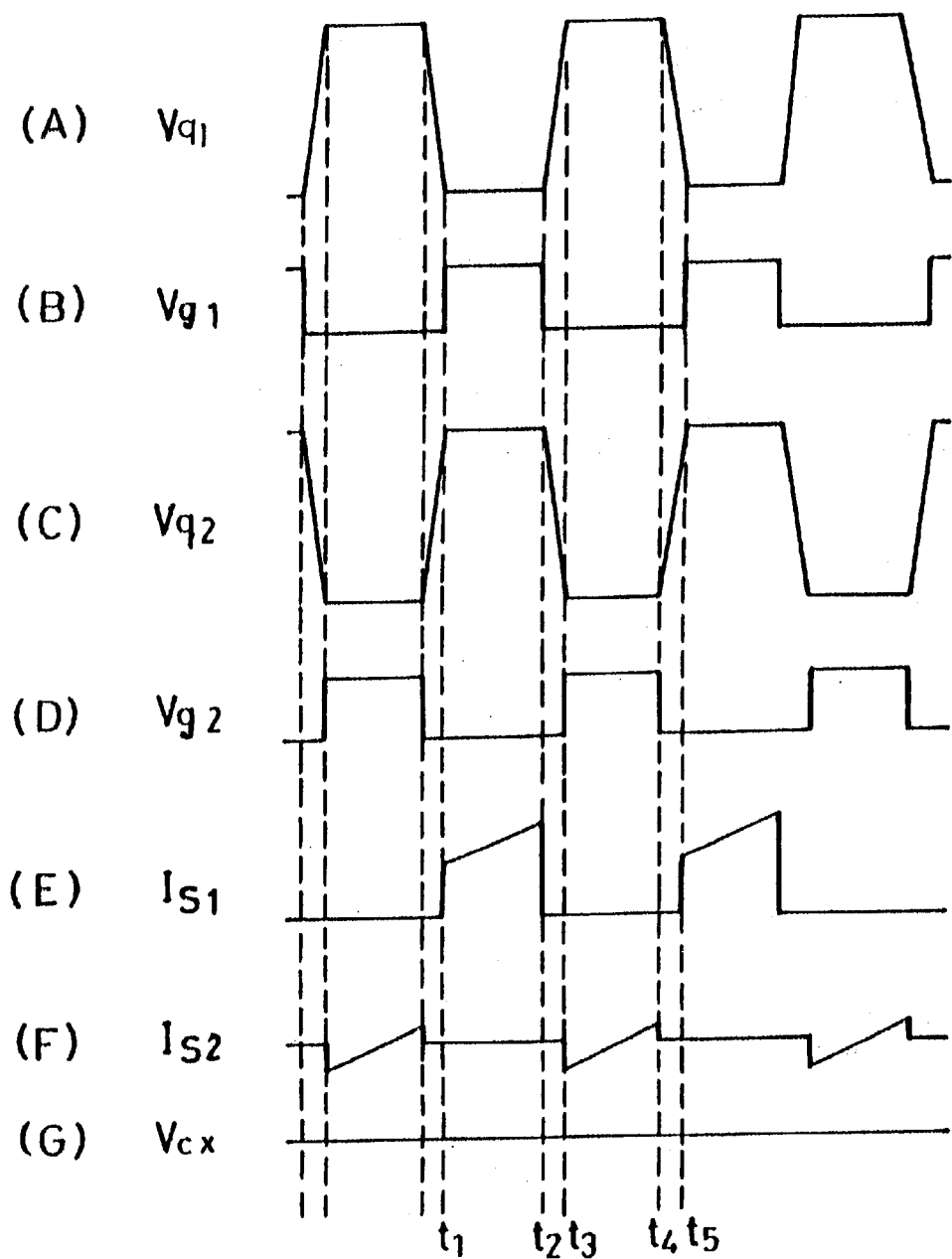
FIG. 13, consisting of (A) through (G), is a series of waveform diagrams useful in explaining the operation of the FIGS. 11 and 12 power supply.

Embodiment of FIGS. 11–13

The switching power supply of FIG. 11 differs from that of FIG. 1 in additionally comprising a resonance capacitor $C_x$, a resonance switch $Q_2$ in the form of a field effect transistor, and a switch control circuit 30 for the resonance switch $Q_2$. All the other details of construction are as previously set forth with reference to FIGS. 1–3.

The resonance switch $Q_2$ is connected in parallel with the power control switch $Q_1$ via the resonance capacitor $C_x$. Both switches $Q_1$ and $Q_2$ take the form of insulated gate field effect transistors, each with the source connected to the substrate or bulk. Therefore, as depicted in FIG. 12, the switches $Q_1$ and $Q_2$ can be shown as switches proper $S_1$ and $S_2$ having diodes $D_{11}$ and $D_{12}$ connected inversely in parallel therewith, as well as stray capacitances $C_{11}$ and $C_{12}$, connected in parallel therewith. Alternatively, however, the diodes $D_{11}$ and $D_{12}$ and capacitors $C_{11}$ and $C_{12}$ may be provided as discrete units.

FIG. 13 indicates at (A) and (C) the drain-source voltages $V_{q1}$ and $V_{q2}$ of the switches $Q_1$ and $Q_2$, at (B) and (D) the control signals $V_{g1}$ and $V_{g2}$ applied from the switch control circuits 7 an 30 to the gates of the switches $Q_1$ and $Q_2$, at (E) and (F) the currents $I_{s1}$ and $I_{s2}$ flowing through the switches proper $S_1$ and $S_2$ of the switches $Q_1$ and $Q_2$, and at (G) the voltage $V_{cx}$ across the resonance capacitor $C_x$.

A comparison of the waveforms (B) and (D) in FIG. 13 will reveal that the resonance switch control signal $V_{g2}$ is designed to open the resonance switch $Q_2$ during the non-conducting periods of the power control switch $Q_1$ under the control of the switch control signal $V_{g1}$. It will be further observed from these waveforms that the durations of the switch control pulses $V_{g2}$ are shorter than the spacings between the power control switch control pulses $V_{g1}$, and vice versa. Consequently, between the conducting periods of the switches $Q_1$ and $Q_2$, there exist brief transition periods during which both of these switches are off, as from $t_2$ to $t_3$ and from $t_4$ to $t_5$ in FIG. 13.

During the conducting periods of the switch $Q_1$, as from $t_1$ to $t_2$ in FIG. 13, current flows through the closed circuit comprising the capacitor $C_{dc}$, transformer primary $N_1$, and switch $Q_1$, as well as through the closed circuit comprising the capacitor $C_1$, inductor $L_1$, diode $D_5$, transformer primary second part $N_{1b}$, and switch $Q_1$. When the switch $Q_1$ is subsequently opened $t_2$, current will flow through the stray capacitance $C_{11}$, FIG. 12, of the switch $Q_1$ thereby charging the same. The voltage $V_{q1}$ across the switch $Q_1$ will therefore rise gradually during the ensuing $t_2$–$t_3$ period, as at (A) in FIG. 13. Thus has been accomplished the zero voltage switching of the switch $Q_1$, when it is turned off, with the consequent reduction of switching loss.

Upon completion of the charging of the stray capacitance $C_{11}$, at $t_3$, current will flow through the closed circuit of the capacitor $C_{dc}$, transformer primary $N_1$, resonance capacitor $C_x$, and the switch $S_2$ or diode $D_{12}$ of the resonance switch $Q_2$, as well as through the closed circuit of the capacitor $C_1$, inductor $L_1$, diode $D_5$, transformer primary second part $N_{1b}$, capacitor $C_x$, and switch $S_2$ or diode $D_{12}$. Then, as the capacitor $C_x$ discharges, current will flow reversely through the closed circuit of the capacitor $C_x$, transformer primary $N_1$, capacitor $C_{dc}$, and switch $S_2$, as well as through the circuit of the capacitor $C_1$, inductor $L_1$, diode $D_5$, transformer primary first part $N_{1a}$, and capacitor $C_{dc}$. The capacitor $C_x$ is of such great capacitance that, after having been charged with its right hand side, as seen in FIGS. 11 and 12, positive, it will maintain this voltage $V_{cx}$ approximately constant as at (G) in FIG. 13.

When the switch $Q_2$ is turned off at $t_4$, the stay capacitance $C_{11}$, of the switch $Q_1$, will be reversely charged, with the result that the voltage $V_{q1}$ across the switch $Q_1$, will drop as at (A) in FIG. 13. The current reversely charging the stray capacitance $C_{11}$, will flow through the closed circuit of the capacitor $C_{dc}$, capacitance $C_{11}$, and transformer primary $N_1$, so that the charge on the capacitance $C_{11}$ will be returned to the capacitor $C_{dc}$, or to the capacitor $C_0$ of the rectifying and smoothing circuit 6. The voltage across the switch $Q_1$ will be approximately zero when it is turned on at $t_5$ to permit the current $I_{q1}$ to flow therethrough, again realizing a decrease in switching loss.

Possible Modifications

Notwithstanding the foregoing detailed disclosure it is not desired that the present invention be limited by the exact details of the illustrated embodiments. The following is a brief list of possible modifications or alterations that will readily suggest themselves to one skilled in the art on the basis of this disclosure and without departure from the scope of the invention:

1. The second switch $Q_2$ together with the capacitor $C_x$ and switch control circuit 30 could be added to all of the FIGS. 5–10 embodiments.
2. The transformers 5 and 5a and rectifying and smoothing circuit 6 of the FIGS. 5–8 embodiments could all be of the forward constructions like their FIG. 9 counterparts $5_b$ and $6_a$.
3. A bipolar transistor and like semiconductor switch other than an FET could be used as the switch $Q_1$.
4. The rectifier circuit 4 and switch $Q_1$, could be reversed in polarity.
5. The inductor $L_1$ and reverse blocking diode $D_5$ could be connected in positions indicated by the broken lines in FIGS. 1 and 5–11.
6. Autotransformers could be employed in places of the transformers 5, $5_a$, $5_b$ and $5_c$.

What is claimed is:

1. A switching power supply capable of translating a.c. voltage into d.c. voltage, comprising:
   (a) a pair of a.c. input terminals for inputting a.c. voltage having a known frequency;
   (b) a pair of d.c. output terminals for outputting d.c. voltage;
   (c) a rectifier circuit connected to the pair of input terminals;
   (d) a transformer having a winding;
   (e) a rectifying and smoothing circuit connected between the transformer and the pair of d.c. output terminals for providing the d.c. output voltage;
   (f) an inductor for improvement of the power factor of the input terminals;
   (g) a reverse blocking diode;
   (h) a smoothing capacitor connected between the pair of outputs of the rectifier circuit via at least part of the transformer winding, the reverse blocking diode and the inductor;

(i) a switch connected between the pair of outputs of the rectifier circuit via at least the inductor and the reverse blocking diode, and in parallel with the smoothing capacitor via at least part of the transformer winding;

(j) a switch control circuit connected to the switch for on-off control of the switch at a repetition frequency higher than the frequency of the a.c. input voltage;

(k) a bypass capacitor for reduction of high frequency noise connected between the pair of outputs of the rectifier circuit and in parallel with the serial circuit of the inductor and the reverse blocking diode and at least part of the transformer winding and the smoothing capacitor, the bypass capacitor being less in capacitance than the smoothing capacitor; and (l) the reverse blocking diode having a reverse recovery time shorter than the nonconducting periods of the switch.

2. The switching power supply of claim 1 further comprising an additional capacitor for further reduction of high frequency noise connected in parallel with the switch via at least the reverse blocking diode and with the bypass capacitor via the inductor, the additional capacitor being less in capacitance than the smoothing capacitor.

3. The switching power supply of claim 1 wherein the transformer winding is tapped to provide a first and a second division, wherein the first division of the transformer winding forms a serial circuit with the inductor and the reverse blocking diode and the switch, which serial circuit is connected between the pair of outputs of the rectifier circuit, and wherein the smoothing capacitor is connected in parallel with a serial circuit of both first and second divisions of the transformer winding and the switch.

4. The switching power supply of claim 1 wherein the complete transformer winding forms a serial circuit with the inductor and the reverse blocking diode and the smoothing capacitor, which serial circuit is connected between the pair of outputs of the rectifier circuit, and wherein a serial circuit of the complete transformer winding and the switch is connected in parallel with the smoothing capacitor.

5. The switching power supply of claim 1 further comprising:

(a) an additional capacitor connected in series with the inductor and the reverse blocking diode; and (b) means connected to the transformer winding and the additional capacitor for charging the latter by utilizing a voltage that develops across the transformer winding during the nonconducting periods of the switch.

6. The switching power supply of claim 1 wherein the transformer winding is tapped to provide a first and a second division which are opposite in polarity, wherein the first division of the transformer winding forms a serial circuit with the inductor and the reverse blocking diode and the smoothing capacitor, which serial circuit is connected between the pair of outputs of the rectifier circuit, and wherein the second division of the transformer winding forms a second serial circuit with the switch, which second serial circuit is connected in parallel with the smoothing capacitor.

7. The switching power supply of claim 1 wherein the transformer comprises a primary winding and a secondary winding electromagnetically coupled to the primary winding, and wherein the rectifying and smoothing circuit is connected to the secondary winding and adapted to liberate energy from the transformer during the nonconducting periods of the switch.

8. The switching power supply of claim 1 wherein the transformer comprises a primary winding and a secondary winding electromagnetically coupled to the primary winding, and wherein the rectifying and smoothing circuit is connected to the secondary winding and adapted to liberate energy from the transformer during the conducting periods of the switch.

9. The switching power supply of claim 1 wherein the transformer comprises a primary winding and a secondary winding electromagnetically coupled to the primary winding, and wherein the secondary winding is connected to the rectifying and smoothing circuit and tapped to provide a first and a second division, and wherein the rectifying and smoothing circuit comprises:

(a) a first and a second diode connected respectively to the first and the second division of the transformer secondary; and (b) a smoothing capacitor connected to the first and the second diode.

10. The switching power supply of claim 1 further comprising:

(a) a capacitor connected in parallel with the switch;

(b) a first resonant diode inversely connected in parallel with the switch;

(c) a resonant capacitor;

(d) a second switch connected in parallel with the first recited switch via the resonant capacitor;

(e) a second resonant diode connected in parallel with the second switch and being opposite in orientation to the first resonant diode; and (f) a second switch control circuit connected to the second switch for holding the latter closed from a moment following the beginning of each nonconducting period of the first switch to a moment preceding the end of each nonconducting period of the first switch.

* * * * *

UNITED STATES PATENT AND TRADEMARK OFFICE
CERTIFICATE OF CORRECTION

PATENT NO. : 6,574,122 B2
DATED : June 3, 2003
INVENTOR(S) : Koichi Morita et al.

It is certified that error appears in the above-identified patent and that said Letters Patent is hereby corrected as shown below:

Column 2,
Line 19, delete "switch," and insert -- switch. -- therefor;

Column 3,
Line 53, delete "$\mathbf{4_c}$," and insert -- $\mathbf{4_c}$ -- therefor;

Column 4,
Line 65, delete "o" and insert -- to -- therefor;

Column 5,
Line 24, delete "he" and insert -- the -- therefor;
Line 39, delete "$\mathbf{I_{q1}}$," and insert -- $\mathbf{I_{q1}}$. -- therefor;
Line 44, delete "$\mathbf{I_{q1}}$," and insert -- $\mathbf{I_{q1}}$ -- therefor;

Column 7,
Line 17, delete "$\mathbf{Q_1}$" and insert -- $\mathbf{Q_1}$. -- therefor;

Column 8,
Line 11, delete "$\mathbf{N_1}$," and insert -- $\mathbf{N_1}$ -- therefor;
Line 20, delete "$\mathbf{4_c}$," and insert -- $\mathbf{4_c}$ -- therefor;

Column 9,
Lines 18 and 32, delete "$\mathbf{Q_1}$," and insert -- $\mathbf{Q_1}$ -- therefor;
Lines 22 and 25, delete "$\mathbf{D_{11}}$," and insert -- $\mathbf{D_{11}}$ -- therefor;
Line 30, delete "an" and insert -- and -- therefor;
Line 31, delete "$\mathbf{I_{s1}}$," and insert -- $\mathbf{I_{s1}}$ -- therefor;
Line 60, delete "$\mathbf{C_{11}}$," and insert -- $\mathbf{C_{11}}$ -- therefor;

UNITED STATES PATENT AND TRADEMARK OFFICE
CERTIFICATE OF CORRECTION

PATENT NO.   : 6,574,122 B2
DATED        : June 3, 2003
INVENTOR(S)  : Koichi Morita et al.

It is certified that error appears in the above-identified patent and that said Letters Patent is hereby corrected as shown below:

<u>Column 10,</u>
Lines 10 and 13, delete "$\mathbf{C_{11}}$," and insert -- $\mathbf{C_{11}}$ -- therefor;
Lines 10 and 11, delete "$\mathbf{Q_1}$," and insert -- $\mathbf{Q_1}$ -- therefor;
Line 16, delete "$\mathbf{C_{dc}}$," and insert -- $\mathbf{C_{dc}}$ -- therefor.

Signed and Sealed this

Thirtieth Day of December, 2003

JAMES E. ROGAN
*Director of the United States Patent and Trademark Office*